(12) United States Patent
Pennacino et al.

(10) Patent No.: US 11,085,510 B2
(45) Date of Patent: Aug. 10, 2021

(54) TOOTHED WHEEL

(71) Applicant: Safran Transmission Systems, Colombes (FR)

(72) Inventors: Antoine Jacques Marie Pennacino, Moissy-Cramayel (FR); Mathieu Jean Charrier, Moissy-Cramayel (FR); Boris Pierre Marcel Morelli, Paris (FR)

(73) Assignee: Safran Transmission Systems, Colombes (FR)

(*) Notice: Subject to any disclaimer, the term of this patent is extended or adjusted under 35 U.S.C. 154(b) by 48 days.

(21) Appl. No.: 16/662,219

(22) Filed: Oct. 24, 2019

(65) Prior Publication Data
US 2020/0132167 A1 Apr. 30, 2020

(30) Foreign Application Priority Data
Oct. 30, 2018 (FR) ..................... 1860026

(51) Int. Cl.
*F16H 55/08* (2006.01)
*F16H 1/36* (2006.01)

(52) U.S. Cl.
CPC ............... *F16H 1/36* (2013.01); *F16H 55/08* (2013.01)

(58) Field of Classification Search
CPC ........ F16H 1/36; F16H 55/08; F16H 57/0482; F16H 55/17; F16H 57/0479; F16H 1/08; F16H 55/10; F16H 57/0456; F02C 7/36
See application file for complete search history.

(56) References Cited

U.S. PATENT DOCUMENTS

| | | | |
|---|---|---|---|
| 2013/0102432 A1* | 4/2013 | Imai | F16H 57/0409 475/159 |
| 2014/0309078 A1* | 10/2014 | Curti | F02C 7/36 475/331 |
| 2017/0108113 A1* | 4/2017 | Hasting | F02C 7/36 |
| 2017/0227093 A1 | 8/2017 | Matsumoto et al. | |

FOREIGN PATENT DOCUMENTS

| | | | | |
|---|---|---|---|---|
| CN | 106151426 A | 11/2016 | | |
| FR | 3 047 279 A1 | 8/2017 | | |
| JP | 11348039 A | * 12/1999 | ............. | B30B 9/325 |
| JP | H11-348039 A | 12/1999 | | |

* cited by examiner

*Primary Examiner* — Justin Holmes
(74) *Attorney, Agent, or Firm* — Blank Rome LLP

(57) ABSTRACT

A toothed wheel extending along an axis and comprising at least two annular toothed areas and an annular groove located axially between said toothed areas, intended for collecting lubricating oil from said toothed areas, characterized in that said groove is delimited by an axially extending bottom surface and radially extending lateral surfaces, characterized in that the groove has at least one projecting portion extending radially outwards from the bottom surface of the groove.

8 Claims, 4 Drawing Sheets

TOOTHED WHEEL

CROSS-REFERENCE TO RELATED APPLICATIONS

This application claims the benefit of French Patent Application 1860026, filed Oct. 30, 2018, the contents of which is incorporated herein by reference.

FIELD OF THE INVENTION

The present invention relates to a toothed wheel, intended in particular to form a satellite gear of a gear train speed reducer, in particular for a turbomachine.

TECHNICAL BACKGROUND

As shown in FIG. 1 an aircraft turbomachine 1 conventionally includes, in the downstream direction, i.e. the gas flowing direction inside the turbomachine, a fan 2, a low pressure compressor 3, a high pressure compressor 4, a combustion chamber 5, a high pressure turbine 6 and a low pressure turbine 7. The low-pressure compressor 3 is driven in rotation by the low-pressure turbine 7, through a low-pressure shaft 8. The high-pressure compressor 4 is driven in rotation by the high-pressure turbine 6, through a high-pressure shaft 9, coaxial with the low-pressure shaft. The axis of the turbomachine 1 and the axes of said shafts 8, 9 coincide and are noted X. The fan 2 is driven in rotation by the low-pressure shaft 8, via a gear train speed reducer 10.

As shown in FIG. 2, such a speed reducer 10 generally has a radially internal planet gear 11 capable of pivoting about an axis that coincides with the X axis, a radially external annular planet gear 12 coaxial with the internal planet gear 11, and satellite gears 13 meshing with the internal planet gear 11 and the external planet gear 12. Each satellite gear 12 is mounted pivoting about an axis 14 belonging to a satellite gear carrier 15 and the geometric axis of which is marked Y.

The internal planet gear 11 can also be called a sun gear. The external planet 12 is also called a crown gear.

The satellite gear carrier 15 can be stationary, the crown 12 being able to rotate. Such a speed reducer 10 is then of the planet gear type.

Alternatively, the crown 12 can be stationary, the satellite gear carrier 15 being able to rotate. Such a speed reducer 1 is then of the epicyclic type.

The low-pressure shaft 8 is generally coupled in rotation to the internal planet gear 11 and the shaft 16 of the fan 2 is coupled in rotation to the moving output element of the gear train, i.e. either to the crown 12 in the case of a planet gear type speed reducer 10 or to the satellite gear carrier 15 in the case of an epicyclic type speed reducer 10.

The gear train 10 is housed in a housing 17 and is lubricated by oil supply means, as known in particular from document FR 3 047 279, in the name of the Applicant. In the following description, we will focus in particular on the lubrication of satellite gears 13 and/or the internal planet gear 11.

It is known to use satellite gears 13 and internal planet gears 11 with chevron gearing, as shown in FIGS. 3 and 4.

Each satellite gear 13 then takes the form of a toothed wheel or pinion, with a body comprising a central hole with a geometric axis Y, intended for mounting the satellite gear on an axis of the satellite gear carrier.

In the following, the terms axial and radial are defined with respect to the X axis.

The body comprises a first toothed area 18 and a second toothed area 19, axially spaced from each other and delimiting between them an annular groove 20 with a rectangular or square cross-section The groove 20 is thus delimited by a cylindrical bottom wall 21 and two radial lateral walls 22 formed by the corresponding axial ends of the toothed areas 18, 19. The bottom wall 21 is located radially inside with respect to the bottom of the teeth portions of the areas 18, 19.

The toothed areas 18, 19 form a chevron gearing. In other words, the two toothed areas 18, 19 each have two helical teeth portions, of identical dimensions, but having opposite helixes in order to cancel the axial force on the assembly.

In operation, low temperature lubricating oil is supplied to the teeth portions of each satellite gear 13 where it heats up. The hot oil from the teeth portions then enters the groove 20, due to the shape and orientation of the teeth portions. The oil is evacuated from the groove 20 by centrifugation, as shown schematically by the arrows in FIG. 4.

In practice, it is difficult to control the position and the axial dimension of the oil discharge area. Indeed, the lateral walls 22 of the groove 20 form areas of discontinuity of the surface that are favourable to the detachment of part of the oil. In addition, it has been found that oil also comes off the bottom surface 21 of the groove 20 over the whole axial dimension of the groove 20.

It is important to control the axial position of the hot oil evacuated by centrifugation, radially outwards, in order to prevent it from lubricating other surrounding toothed areas. Indeed, since the oil is already hot, its lubricating and caloric absorption capacity is low, reducing the effectiveness of such lubrication.

In addition, the oil ejected from the satellite gears can wet surfaces that do not necessarily need to be lubricated, increasing the volume of oil required for lubrication. However, this volume of oil is defined by the capacity of a tank the dimensions of which are limited by the space available within the turbomachine.

In addition, collectors (shown in dotted lines in FIG. 2) can be provided circumferentially between the satellite gears, these collectors being in charge with collecting part of the lubricating oil from the satellite gears. Controlling the axial position of the lubricating oil ejection area would make it possible to optimize and reduce the dimensions and mass of these collectors.

The invention aims to remedy these various constraints in a simple, reliable and inexpensive way.

SUMMARY OF THE INVENTION

For this purpose, the invention relates to a toothed wheel extending along an axis and comprising at least two annular toothed areas and an annular groove located axially between said toothed areas, intended for collecting lubricating oil from said toothed areas, characterized in that said groove is delimited by an axially extending bottom surface and radially extending lateral surfaces, characterized in that the groove comprises at least one projecting portion extending radially outwards from the bottom surface of the groove.

Said projecting portion is thus capable of generating a geometric discontinuity causing the oil film contained in the groove to detach so that this oil is expelled radially outwards under the effect of the centrifugal forces generated in operation. As the axial position of the projecting portion is known, it is possible to control the axial position of the ejected oil and thus to prevent such oil from reaching, or from reaching in too large a quantity, undesired elements of the environment which the toothed wheel belongs to.

Elements to be cooled are thus not supplied with hot oil. In addition, it is also avoided to supply oil to elements of the environment that do not necessarily need to be lubricated. This limits the volume of oil to be used, which makes it possible to reduce the size of the oil tank required to supply lubricating oil.

In the case where a collector is used to recover all or part of the oil ejected from the toothed wheel, the axial control of the oil ejection position allows the collector to be optimally sized, in order to limit in particular its mass and size.

Said projecting portion may have at least one radially external apex forming a break of slope of the surface of said projecting portion.

The formation of a break of slope, i.e. a sudden or discontinuous change in the slope of the surface formed by the projecting portion, facilitates the detachment of the oil film. This ensures that most of the oil film in the groove is detached in the radial plane of the break of slope. The break of slope is convex in that it forms a projecting area, not a recessed area.

Said projecting portion may be symmetrical in shape with respect to a radial plane located, for example, in an axially median area of the groove.

The apex can be located in said radial plane or centered on said radial plane. In the case where there are two apexes for example, these apexes may be located on either side of an axially median radial plane, symmetrically with respect to said median plane.

Of course, said radial plane can be located elsewhere than in the centre of the groove.

Said projecting portion may comprise, axially from one toothed annular area to another, at least one inclined area progressively extending radially outwards, one area forming a radially external apex, and at least one inclined area progressively extending radially inwards.

An inclined area is defined as an area, the radially outward facing surface of which is inclined both with respect to the radial direction and with respect to the axial direction.

Each inclined area can be flat, concave or convex.

The projecting portion can be annular.

The projecting portion thus extends continuously over the whole circumference of the groove.

Alternatively, the projecting portion may be discontinuous and extend in angular sectors around the circumference of the groove. In this case, the angular sectors can be evenly distributed over the circumference, so as to avoid the appearance of an unbalance during operation.

The two toothed areas can form a chevron gearing.

As mentioned above, a chevron gearing has two helical teeth portions, generally of the same dimensions, but with opposite direction helixes, in order to cancel the axial force exerted on the toothed wheel. The central groove then allows the cutting tools to be easily disengaged at the intersection of the two helixes, the groove being also used for the discharge of the lubricant.

In other words, in such a case, the teeth of the first toothed area are inclined in a first direction with respect to the axis of the toothed wheel, the teeth of the second toothed area being inclined with respect to the axis in a second direction, opposite the first direction. The teeth of both areas thus delimit general V shapes.

Of course, other types of teeth portions can be used, the teeth portion being able to form a spur gear, i.e. the axes of the elements of which meshing with each other are parallel. For example, the teeth can be oriented parallel to the axis of the toothed wheel. More generally, the invention is applicable to all parallel axis gears having at least two toothed areas separated by one or more grooves.

The projecting portion may be produced in one piece with the bottom surface of the groove.

The projecting portion can be formed by at least one part distinct from the rest of the toothed wheel.

The separate part can be annular or sectorized. The annular part or the sectors can be attached to the rest of the toothed wheel by flanges or by any other appropriate means.

The axial dimension of the projecting portion may extend over all or part of the axial dimension of the groove.

The bottom surface of the groove can be cylindrical.

The apex of the projecting portion may be located radially within the radially external periphery of the toothed areas. In other words, the apex of the projecting portion can be located radially inside the groove.

The radial distance between the bottom of the groove and the apex can be between 50% and 100% of the radial dimension or height of the groove.

It is also possible to consider an alternative solution where the apex of the projecting portion is located radially outside the groove, i.e. radially outside the radially external periphery of the toothed areas.

The apex of the projecting portion may be located in a single radial plane or extend axially over a part of the axial dimension of the groove.

The toothed areas can be produced in one piece with a toothed wheel body or can be produced in separate parts, attached to the body.

The invention also relates to a gear train speed reducer, comprising a radially internal planet gear capable of pivoting about an axis, a radially external annular planet gear coaxial with the internal planet gear, at least one satellite gear meshing with the internal planet gear and with the external planet gear, the satellite gear being pivoted about an axis belonging to a satellite gear carrier, characterized in that the satellite gear is formed by a toothed wheel of the aforementioned type.

The internal planet gear can also be called a sun gear. The external planet is also called a crown gear.

The satellite gear carrier can be stationary, the crown being able to rotate. Such a speed reducer is then of the planet gear type.

Alternatively, the crown can be stationary, the satellite gear carrier being able to rotate. Such a speed reducer is then of the epicyclic type.

The invention may also relate to a turbomachine, such as an aircraft turbojet or turboprop engine, with a gear train speed reducer of the above-mentioned type.

The invention will be better understood and other details, characteristics and advantages of the invention will appear when reading the following description, which is given as a non-limiting example, with reference to the attached drawings.

DETAILED DESCRIPTION

Figure 5:
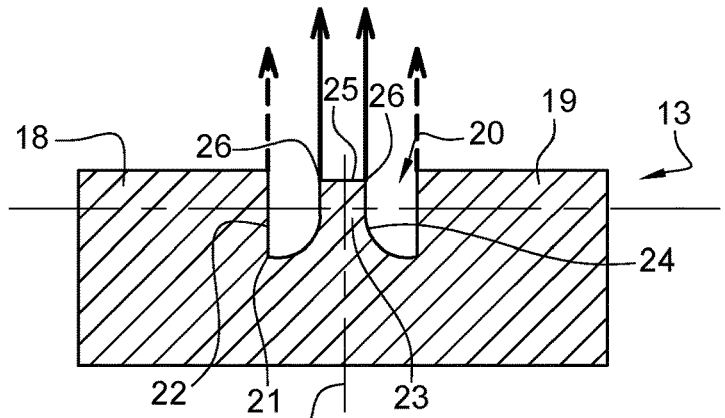
FIGS. 5 to 12 are views corresponding to FIG. 4, illustrating different forms of embodiments of a toothed wheel according to the invention.

FIG. 5 shows a toothed wheel or satellite gear 13 according to a first embodiment of the invention;

As before, this toothed wheel 13 has a body with a central hole with a geometric axis Y, intended for mounting the toothed wheel or satellite gear 13 on an axis 14 of the satellite gear carrier 15. The body has a first toothed area 18 and a second toothed area 19, axially spaced from each other and delimiting an annular groove 20 with a rectangular cross-section between them.

The groove 20 is delimited by a bottom 21 and two radial lateral walls 22 formed by the corresponding axial ends of the toothed areas 18, 19.

The toothed areas 18, 19 form a chevron gearing. In other words, the two toothed areas 18, 19 each have two helical teeth portions, of identical dimensions, but having opposite helixes in order to cancel the axial force on the assembly.

Figure 1:
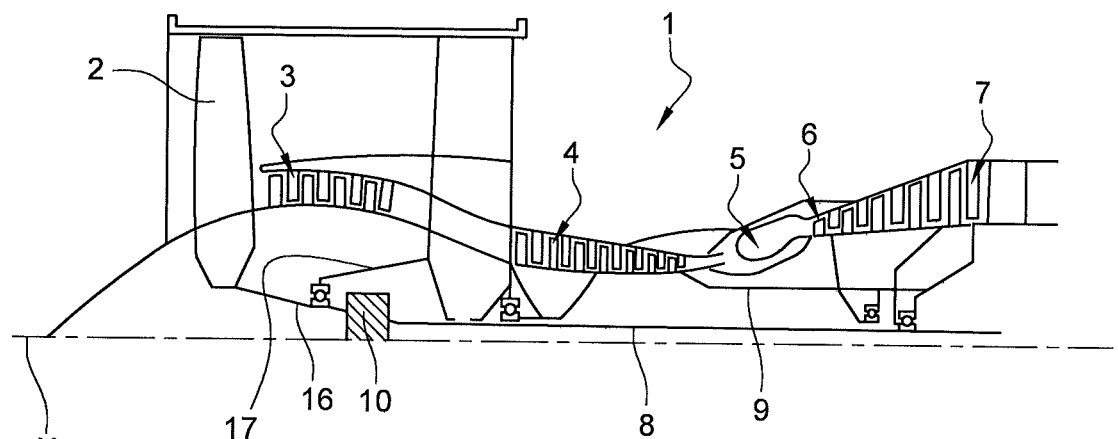
FIG. 1 is a schematic cross-sectional half-view of a turbofan engine of the prior art.
Figure 2:
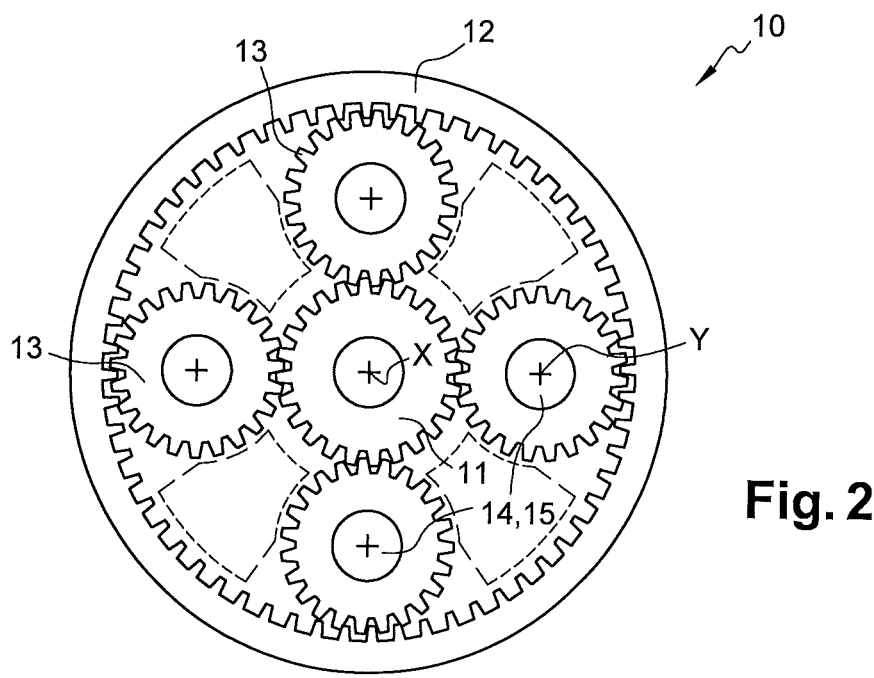
FIG. 2 is a schematic front view of a portion of a gear train speed reducer.
Figure 3:
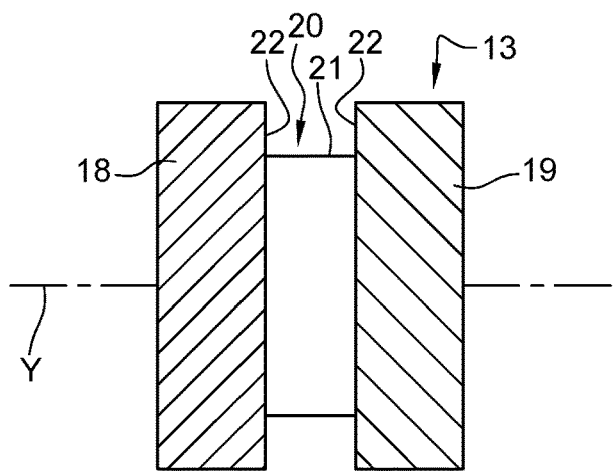
FIG. 3 is a side view of a toothed wheel of the prior art, forming a satellite gear here.
Figure 4:
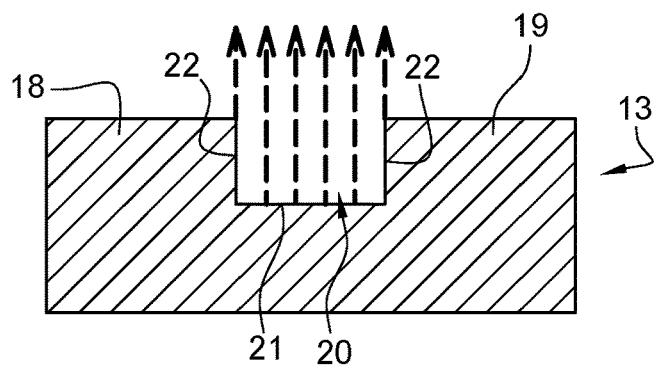
FIG. 4 is a cross-sectional view of a portion of the toothed wheel of FIG. 3.

This toothed wheel 13 differs from the one described in reference to FIGS. 3 and 4 in that the groove 20 has a projecting portion 23 extending radially outwards from the bottom of the groove.

The projecting portion 23 is symmetrical with respect to a median axial plane P passing through the middle of the groove 20. The projecting portion 23 extends over the whole axial dimension or width of the groove 20, so that the bottom wall 21 is not visible as such.

The projecting portion 23 has two concave curved lateral walls 24, located on either side of the median plane P and an apex 25 forming a cylindrical portion, the axial dimension of which can be adjusted according to needs.

The radially internal ends of the concave walls 24 join the bottom 21 of the groove 20 and the lateral walls 22 of the groove 20. The radially external ends of the concave walls 24 reach the apex 25 forming breaks of slope 26, i. e. discontinuities or ruptures in the slope.

The radially internal ends of the concave walls 24 are located radially inwards with respect to the bottom of the teeth portions of the toothed areas 18, 19, so that the oil can flow into the groove 20.

The apex 25 is located radially inside the external periphery of the teeth portions. In other words, the apex 25 is located radially inside the groove 20.

In operation, the lubricating oil used to lubricate the teeth portions 18, 19 penetrates into the groove 20 on either side of the plane P, then flows as a film along the concave surfaces 24 before detaching from said concave surfaces 24 and being ejected by centrifugation at the breaks of slope 26 at the apex 25. It should be noted that a small part of the oil can also be ejected at the lateral surfaces 22 of the groove 20, these surfaces 22 also forming breaks of slope that are favourable to the detachment of the oil film.

Checking the axial dimension of the apex 25 makes it possible to axially reduce, if necessary, the oil ejection area at the level of the breaks of slope 26 of the apex 25.

Figure 6:
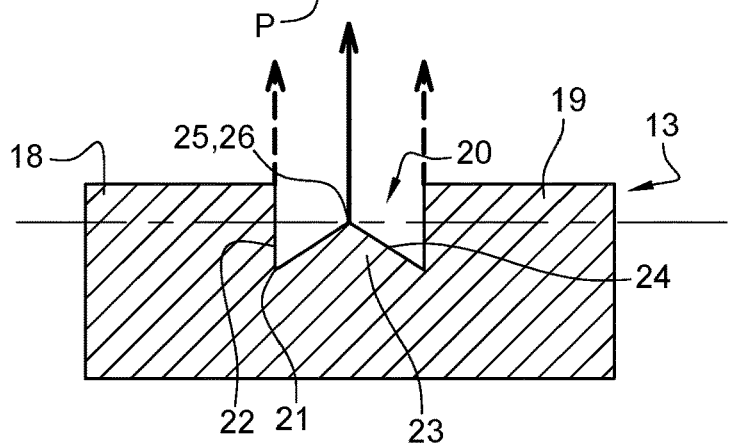

FIG. 6 illustrates a second embodiment, which is different from the one shown in FIG. 5 in that the projecting portion 23 has two inclined flat surfaces 24 the radially external ends of which meet at the apex 25. Each flat surface 24 can be inclined at an angle between 5 and 75°, for example, with respect to the Y axis.

In this embodiment, the axial dimension of the apex 25 is null, so that the apex 25 is reduced to an annular line forming the break of slope 26. In this embodiment too, the projecting portion 23 extends over the whole width of the groove 20. Each flat surface 24 extends over half the width of the groove 20.

Figure 7:
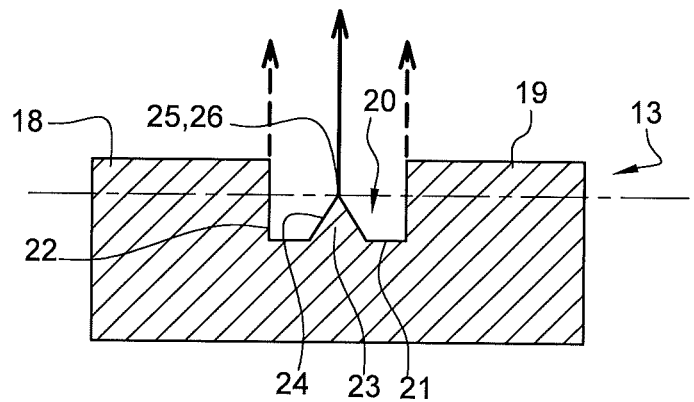

FIG. 7 illustrates a third embodiment, which is different from the one shown in FIG. 6 in that the projecting portion 23 extends over only part of the width of the groove 20.

Figure 8:
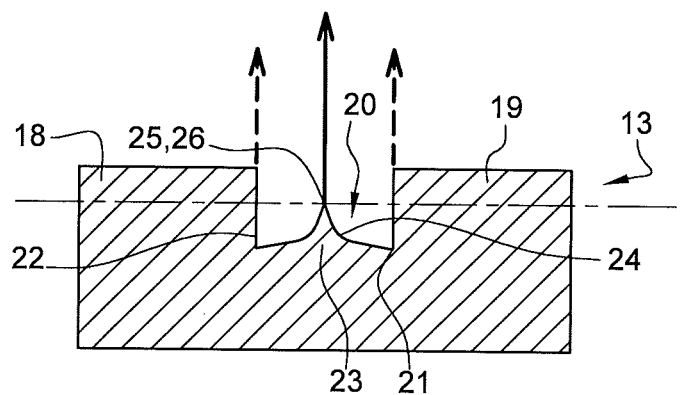

FIG. 8 illustrates a fourth embodiment, which is different from the one shown in FIG. 6 in that the inclined walls 24 are concave walls, the shape of which is different from a circular arc shape and the profile of which is designed to ensure the best possible disengagement of the machining tools from the teeth portions and/or the guidance and ejection of the oil at the apex 25. The inclined walls 24 can also be each formed by two flat portions of different slopes, connected or not by a rounded connecting area.

Figure 9:
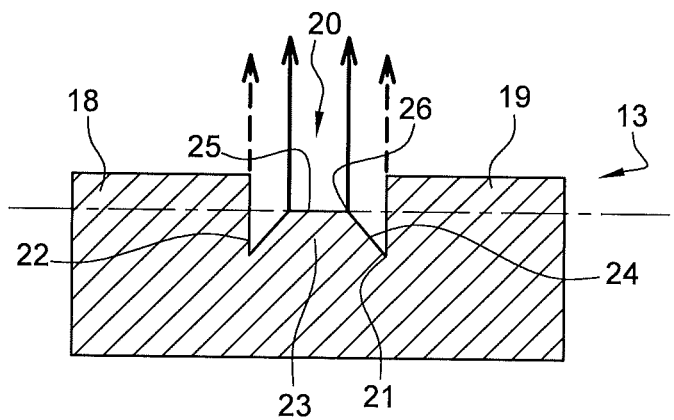

FIG. 9 illustrates a fifth embodiment, which is different from the one shown in reference to FIG. 6 in that the axial dimension of the apex 25 is not zero, defining a cylindrical surface as in the case of FIG. 5. Such a projecting portion 23 thus includes two breaks of slope 26, located at the axial ends of the apex 25.

Figure 10:
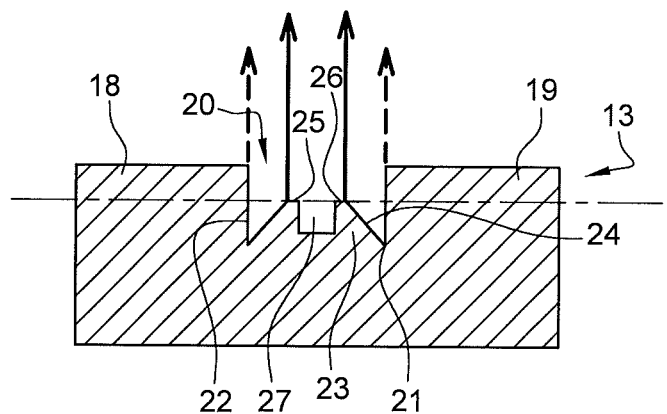

FIG. 10 illustrates a sixth embodiment, which is different from the one shown in FIG. 9 in that an auxiliary groove 27 is formed in the apex 25. The auxiliary groove 27 is delimited here by a cylindrical bottom surface and two radial lateral surfaces. The width of the auxiliary groove 27 is smaller than the width of the cylindrical apex 25. The bottom surface of the auxiliary groove 27 is located radially outwards with respect to the radially internal ends 21 of the flat lateral walls 24.

Figure 11:
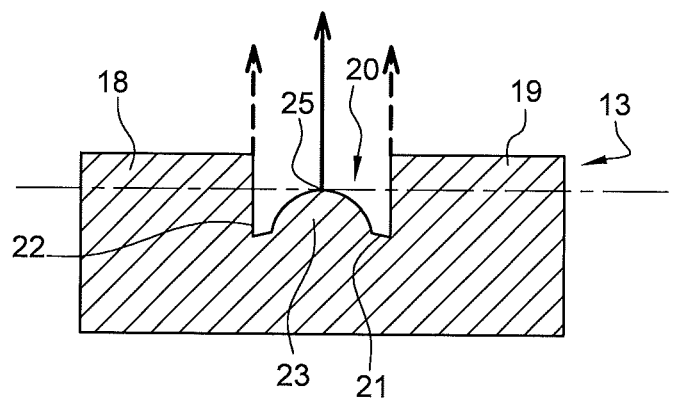

FIG. 11 illustrates a seventh embodiment, which is different from the ones shown above in that the projecting portion 23 has a rounded cross-section, for example in a semicircular shape. Other forms are also possible. The projecting portion 23 extends here over only part of the width of the groove 20. Alternatively, it can extend over the whole width of the groove 20. It should be noted that such a projecting portion 23 does not have a break of slope 26.

Figure 12:
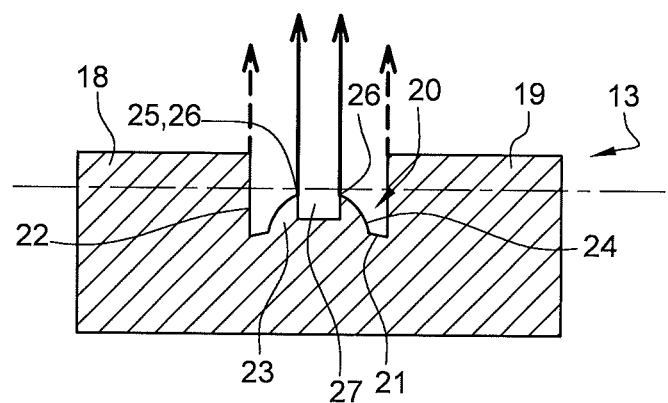

FIG. 12 illustrates an eighth embodiment, which is different from the one shown in FIG. 11 in that an auxiliary groove 27 is formed in the apex 25. The auxiliary groove 27 is delimited here by a cylindrical bottom surface and two radial lateral surfaces. The bottom surface of the auxiliary groove is located radially outwards with respect to the radially internal ends 21 of the rounded lateral walls 24.

The choice of the shape and dimensions of the projecting portion 23 depends in particular on the manufacturing method and must allow the machining tools to be disengaged when the toothed areas 18, 19 are being produced.

In each of the above-mentioned embodiments, the radial distance between the bottom 21 of the groove 20 and the apex 25 may be between 50% and 100% of the radial dimension or height of the groove 20.

The projecting portion 23 can be formed by at least one part separate from the rest of the toothed wheel 13.

The separate part can be annular or sectorized. The annular part or the sectors can be attached to the rest of the toothed wheel 13 by flanges or any other appropriate means.

Each of the above-mentioned embodiments makes it possible to improve the control of the axial position of the ejected oil and thus prevent this oil from reaching, or reaching in too large quantities, undesired elements of the speed reducer.

The invention claimed is:

1. A gear train speed reducer comprising:
a radially internal planet gear capable of pivoting about an axis;
a radially external annular planet gear coaxial with the internal planet gear; and
at least one satellite gear meshing with the internal planet gear and with the external planet gear, the satellite gear being mounted to pivot about an axis belonging to a satellite carrier,
wherein the satellite gear is formed by a toothed wheel extending along an axis and comprising at least two annular toothed areas and an annular groove axially located between said toothed areas, for collecting lubricating oil from said toothed areas,
wherein said groove is delimited by an axially extending bottom surface and radially extending lateral surfaces,
wherein the groove has at least one projecting portion extending radially outwards from the bottom surface of the groove, and
wherein said projecting portion comprises, axially from one annular toothed area to the other, at least one inclined area progressively extending radially outwards, an area forming a radially external apex, and at least one inclined area progressively extending radially inwards.

2. The reducer according to claim 1, wherein said projecting portion has at least one radially external apex forming a break of slope of the surface of said projecting portion.

3. The reducer according to claim 1, wherein said projecting portion has a symmetrical shape with respect to a radial plane located, for example, in an axially median area of the groove.

4. The reducer according to claim 1, wherein each inclined area is flat, concave or convex.

5. The reducer according to claim 1, wherein the projecting portion is annular.

6. The reducer according to claim 1, wherein the two toothed areas form a chevron gearing.

7. The reducer according to claim 1, wherein the projecting portion is produced in one piece with the bottom surface of the groove.

8. The reducer according to claim 1, wherein the projecting portion is formed by at least one part distinct from the rest of the toothed wheel.

* * * * *